April 26, 1949.    F. CALDWELL    2,468,542
TRACTOR MOUNTED SHOVEL LOADER
Filed July 23, 1947    2 Sheets-Sheet 1
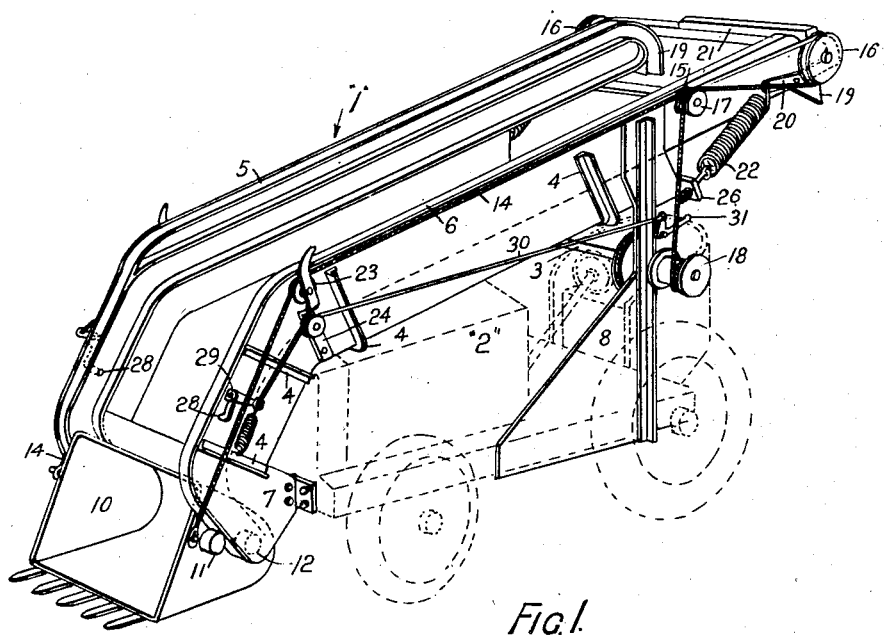
Fig. 1.
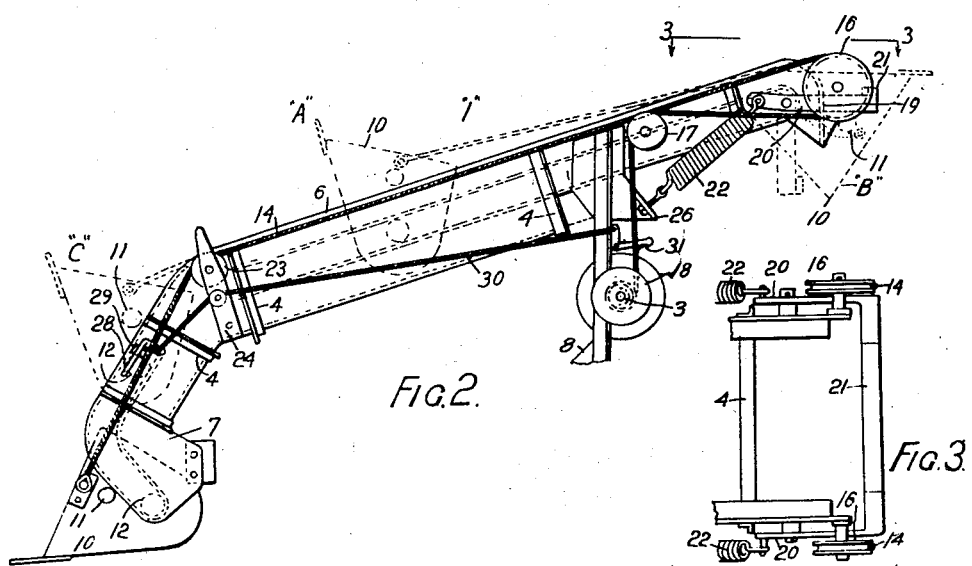
Fig. 2.
Fig. 3.
INVENTOR
FELIX CALDWELL
BY Otto Munk
HIS ATTY April 26, 1949.   F. CALDWELL   2,468,542
TRACTOR MOUNTED SHOVEL LOADER Filed July 23, 1947   2 Sheets-Sheet 2

INVENTOR
FELIX CALDWELL.
BY Otto Munk
HIS ATT'Y

Patented Apr. 26, 1949

2,468,542

UNITED STATES PATENT OFFICE 2,468,542

TRACTOR MOUNTED SHOVEL LOADER

Felix Caldwell, Lindfield, near Sydney, New South Wales, Australia

Application July 23, 1947, Serial No. 762,972
In Australia September 1, 1939

Section 1, Public Law 690, August 8, 1946
Patent expires September 1, 1959

5 Claims. (Cl. 214—103)

This invention relates to improvements in apparatus usable for excavating, shovelling, loading, and such like of material such as sand, earth, grain, stones, coal or the like from one position to another or into a transportable vehicle, the delivery of the material being either from the rear of the apparatus or from the front thereof. When the apparatus is to be used for depositing material at the rear thereof it is designed to permit such deposit without it being necessary to turn it from its set working position of gathering the material, elevating it, and subsequently depositing it in a transportable vehicle or dumping it in a new location.

Said improved apparatus comprises a motor vehicle upon which is mounted a pair of inclined spaced tracks. A gatherer for material to be dumped operates on said tracks. There are means associated with the vehicle and with the gatherer and under control of the driver of the vehicle whereby the gatherer after receiving material thereinto can be elevated on the said tracks and dumped from the gatherer either forwardly or rearwardly of the vehicle as may be desired.

If the material collected by the gatherer is to be dumped therefrom at the rear of the apparatus the gatherer is caused to travel the full length of the tracks, but if the material collected by the gatherer is to be transferred from a gathering location of the gatherer forwardly of the apparatus the gatherer is elevated to a certain position on the forward portion of the tracks and its contents are subsequently dumped in a new location forwardly of the apparatus, means being provided on the apparatus and associated with the tracks for such purpose and under control of the driver of the vehicle.

Other features of the invention are hereinafter referred to.

Figure 4:
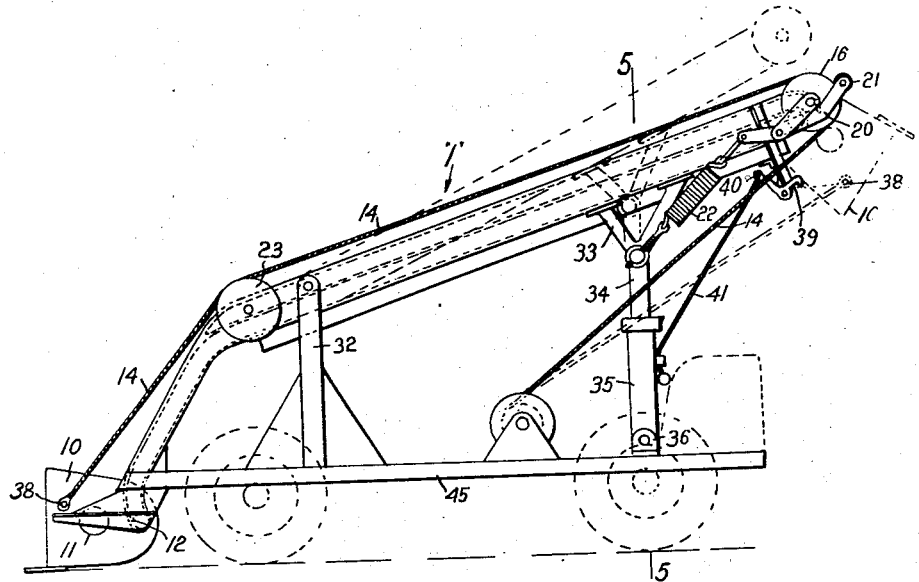
Figure 5:
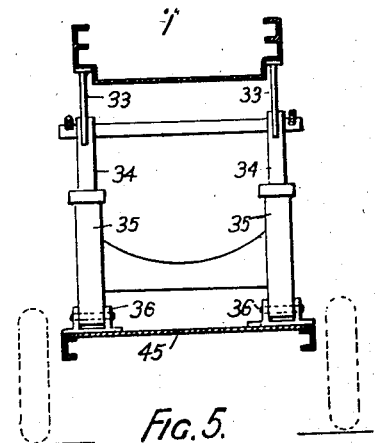

So that the invention may be better understood reference is made to the accompanying drawings, in which: Fig. 1 is a perspective view of one embodiment of the apparatus shown supported upon a power driven vehicle which is depicted in dotted lines; Fig. 2 is a side elevation thereof; Fig. 3 is a plan on line 3—3 of Fig. 2; Fig. 4 is an elevation view of another embodiment of the apparatus; and Fig. 5 is a cross-sectional elevation on line 5—5 of Fig. 4.

For operation of the said improved apparatus for excavating and other purposes beforementioned in one embodiment thereof shown in Figs. 1 to 3, a suitable conveyance 1 is provided; this may consist of a tractor or other suitable motor vehicle means having usual transporting wheels or caterpillar means; upon the conveyance 1 are appropriate motive power means 2 for propelling same. Such motive power means are also adapted to be clutch connectable to a countershaft 3 to rotate same, said countershaft also being on the conveyance 1, for operation of the said apparatus for the purposes mentioned for which it has been designed. The conveyance 1 has also on the body thereof suitable accommodation for a driver thereof and also means whereby the driver can control the conveyance 1 as well as to operate said latter means to permit operation of the apparatus in respect of its particular purposes.

On the body of the conveyance 1 there are also mounted a pair of spaced elevating inclined and partly curved tracks 5 and 6 which are disposed longitudinally of the conveyance 1 and are supported by the brackets 7 and 8 which are rigidly affixed to the body of the conveyance 1. The tracks 5 and 6 have their forward ends disposed downwardly of and in front of the conveyance 1, whereby their extreme lower ends will be in close proximity to ground level. The rear end of the tracks 5 and 6 overhangs the rear end of the body of the conveyance 1 at a suitable height therefrom and to an extent to allow a transportable vehicle to pass readily thereunder for loading thereinto material gathered on the apparatus if such material is not to be dumped at the rear of the apparatus but is to be transported to some other location after it has been delivered from the apparatus. Tracks 5 and 6 are rigidly affixed to transversely disposed angle members 4. A bumper bar may be fitted to the rear portion of the brackets 8 against which the transportable vehicle may abut when material is to be loaded thereinto from the apparatus.

The means for gathering material and which is associated with the apparatus may consist of a bucket 10 or a shovel or such like which, on each vertical side thereof, has a pair of spaced rollers 11 and 12 which are rotatable on separate spindles on said sides and are adapted to run on the tracks 5 and 6. The said tracks are channelled and the rollers 12 run within the channels of the said tracks, while the other rollers 11 run upon the upper surface of the said tracks. The rollers 11 are disposed forwardly of the rollers 12 on the sides of the bucket 10.

Affixed to the forward end of the bucket 10 or such like, at opposite sides thereof, is one end of a pair of hauling ropes 14, chain, cable or such like which are adapted to co-operate with sheaves 15, 16 and 17 disposed at the rear end of the tracks 5 and 6, the opposite end of the ropes 14 thence passing for connection to the barrels of a winch 18. The ropes 14 or such like may also pass over rotatable guide pulleys 23 carried on spindles fixed to the brackets 24 secured on the forward opposite sides of the tracks 5 and 6. The barrels of the winch 18 are fixed to the countershaft 3. The latter is journalled in the brackets 8.

Tracks 5 and 6 at their forward end are shaped so that as the bucket 10 of the apparatus on being pulled upwardly on such end of the tracks 5 and 6 it will be forced into the material to gather same. Such operation of the bucket 10 is effected by operation of the barrels of the winch 18 by clutch connecting the motive power means 2 to the countershaft 3. Said bucket 10 on so receiving its charge of material is subsequently drawn upwardly on the tracks 5 and 6, and in such elevation will be disposed thereon in such manner that the material therein will be held thereby without undue spilling thereof (see dotted lines A or C, Fig. 2).

The extreme rear end of each of the tracks 5 and 6 is partly curved and is turned downwardly as at 19, and such ends of the said tracks have pivoted thereto levers 20 carrying at their forward ends a buffer bar 21; the rear end of each of the levers 20 is connected to one end of an extensible coil spring 22, while the other end of said springs is connected to separate brackets 26 on the outer sides of the tracks 5 and 6. When the bucket 10 contacts with the buffer bar 21 tension is placed on the springs 22 until the bucket 10 reaches its discharging position indicated by dotted lines B (Fig. 2), which is the limit of its rearward travel, that is when the rollers 11 are abutting the down turned portion 19 of the tracks 5 and 6.

On the load of material carried by the bucket 10 having been discharged therefrom at the rear of the apparatus the barrels of the winch 18 can be released from operation by declutching the motive power means 2 from the countershaft 3; the levers 20 assisted by the springs 22 will then operate to start the bucket 10 on its return movement over the down turned ends 19 of the tracks 5 and 6. When the bucket 10 reaches the inclined main portion of the tracks 5 and 6 it can then return by gravity over such inclined portion of the tracks 5 and 6 to the forward position thereof on the down turned forward end of the tracks 5 and 6 to be refilled with material to be gathered therein and can then be again operated as before described for elevating and discharging material from the apparatus.

Should it be desired to use the apparatus for gathering material located at one position and to dispose of same at another position forwardly of the apparatus, the tracks 5 and 6 at their forward end can be provided at said end with engaging means which may consist of oppositely disposed spring loaded hooked bolts 28 which can be pivotally mounted on the brackets 29 carried by the apparatus. One end of the spring means for controlling the bolts 28 can be secured to the bolts and the other to one of the angle members 4. Bolts 28 can be controlled for operation by cables 30 one of the ends of which may be affixed to the separate bell crank levers 31 which are mounted on a rotatable spindle carried by the brackets 8, whereby the bucket 10 after having been loaded with material is elevated to suitable position on the tracks 5 and 6 say as at C, Fig. 2, and held in such position by the driver of the conveyance 1 operating the hooked bolts 28 to allow them to enter the channels of the tracks 5 and 6 whereby the rollers 12 will be engaged by the bolts 28, the said driver simultaneously declutching the shaft 3 from the motive power means 2. The conveyance 1 is then steered by the driver thereof to the desired new location for dumping the material, and upon release operation of the bolts 28 by the driver of the conveyance 1 from engagement with the rollers 12 the bucket 10 or the like will descend by gravity on the tracks 5 and 6 and in such descent will discharge its contents at the said new location. The conveyance 1 can then be again brought to its loading location for gathering of material in the bucket 10 and the operations of loading and transporting and discharging material at the front of the apparatus as above described can thus be performed as may be desired. The bolts 28 are arranged in association with the tracks 5 and 6 in such manner that when such tracks are to be used for allowing material to be carried thereover in the bucket 10 for discharge therefrom at the rear of the apparatus such bolts 28 will not foul in any way the travel of the rollers 12 in the channels of the tracks 5 and 6

In another embodiment of the apparatus shown in Figs. 4 and 5 in which like figures of reference to parts thereof shown also in Figures 1 to 3 are used, the chassis 45 of the motor conveyance 1 has rigidly affixed thereto near its forward end a pair of vertical stanchions 32, these being respectively disposed upon each side of the chassis 45. The opposite end of the stanchions 32 are pivoted to the forward angle member 4 of the tracks 5 and 6. At or near the rear end of each of the tracks 5 and 6 are a pair of brackets 33 which are at one of their ends rigidly secured to the rear angle member 4 of the tracks 5 and 6. The other ends of the respective brackets 33 are pivotally connected to respective plunger rods 34 which can co-operate with hydraulic or air pressure cylinders 35. The cylinders 35 are at one end thereof pivotally mounted on bearing brackets 36 carried by the chassis 45. On operation by the driver of the plunger rods 34 the tracks 5 and 6 and their components can be readily raised or lowered to facilitate discharge of material from the bucket 10.

To maintain the bucket 10 in discharge position thereof, so as to give additional time to permit the contents of the bucket 10 to fall therefrom, the anchor pin 38 to which the hauling rope 14 is secured is adapted to engage a spring loaded hook 39 pivotally mounted on a bracket 40 associated with the rear angle member 4. The hook 39 has secured thereto a cord 41 which is operable by the driver to release the hook 39 from the anchor pin 38 to enable the bucket 10 to be moved on its return journey after the loaded contents thereof have been discharged therefrom.

What I claim as my invention and desire to secure by Letters Patent is:

1. A tractor motor loader comprising a motor vehicle, a pair of inclined spaced channelled tracks mounted on said vehicle and down-turned at their forward portion so that such portion will be near ground level, said tracks having a rear portion partly curved and down-turned, a gatherer on said vehicle for material to be dumped, a pair of rotatable rollers on opposite sides of said gatherer, each pair of said rollers being adapted to engage respectively with the upper and under surfaces of said tracks, each of the said rollers of the pairs being spaced from one another to roll over said tracks, one of the rollers of each pair in such operation preceding the other roller of each pair, winch means on said vehicle flexible elevating means connecting said gatherer with said winch means, and means controllable by the driver of said vehicle whereby power drive means on the said vehicle can be connected to said winch means to permit the latter to haul said gatherer with material therein on said tracks, the material to be dumped from said gatherer or to allow said gatherer to return by gravity to normal gathering position thereof on said tracks.

2. Apparatus according to claim 1, in which the tracks at the rear end thereof have associated therewith a spring controlled buffer bar, such bar on depression by the gatherer permitting the gatherer to ride on the curved down-turned rear portion of the tracks for discharge of material from the gatherer and subsequently to allow return of the gatherer to the inclined position of the tracks whereby by gravity the gatherer will be returned to its normal forward position on the tracks for gathering thereinto of further supplies of material.

3. Apparatus according to claim 1, in which flexible means are associated with the tracks and with spring controlled hooked bolts which are adapted to be operated at will by the driver of the vehicle to engage rollers adapted to run on the under surface of the tracks when the gatherer has been partly elevated on the tracks and which bolts are adapted to be released from said rollers when the contents of the gatherer are to be discharged therefrom at a location forwardly of the apparatus other than the gathering location for such material.

4. Apparatus according to claim 1, in which the chassis of the motor vehicle has thereon at the forward part thereof a pair of vertical stanchions whose bottom ends are rigidly secured to the vehicle chassis and whose upper ends are pivotally associated with their respective tracks, and at or near the rear part of the said chassis there are pivotally mounted a pair of vertically disposed pressure cylinders with each of which cooperates a plunger whose exposed ends are respectively pivoted to one end of a bracket whose other end is rigidly associated with said respective tracks to enable the said tracks to be readily raised or lowered to facilitate discharge of material from the gatherer.

5. Apparatus according to claim 1, in which a pin of the hauling rope of the gatherer is adapted to engage a spring loaded hook pivotally mounted on a bracket associated with the rear of the hauling track, the said hook having secured thereto a cord operable by the driver of the motor vehicle to enable release of said hook from said pin to permit the gatherer to move on its return journey after its loaded contents have been discharged therefrom.

FELIX CALDWELL.

REFERENCES CITED

The following references are of record in the file of this patent:

UNITED STATES PATENTS

| Number | Name | Date |
|---|---|---|
| 1,256,401 | Ward | Feb. 12, 1918 |
| 1,449,733 | Clausen | Mar. 27, 1923 |
| 1,573,700 | Gledhill | Feb. 16, 1926 |
| 1,647,955 | Bryant | Nov. 1, 1927 |
| 1,771,285 | Blackwood et al. | July 22, 1930 |

FOREIGN PATENTS

| Number | Country | Date |
|---|---|---|
| 30,394 | Sweden | Feb. 25, 1911 |